Patented Nov. 11, 1952

2,617,810

UNITED STATES PATENT OFFICE 2,617,810

INHIBITING OXIDATION OF O-HETEROCYCLIC COMPOUNDS

Arthur William Charles Taylor, Norton-on-Tees, England, assignor to Imperial Chemical Industries Limited, a corporation of Great Britain No Drawing. Application December 5, 1949, Serial No. 131,245. In Great Britain December 13, 1948

6 Claims. (Cl. 260—333)

This invention relates to inhibitors of oxidation or peroxidation of liquid organic compounds, in particular of peroxidation of cyclic ethers, more particularly tetrahydrofuran.

It has already been proposed to provide for the presence, in tetrahydrofuran, of stabilising amounts of hydroquinone or of para-cresol to inhibit or prevent the formation of undesirable oxidation products from tetrahydrofuran which is subjected to prolonged exposure to oxygen-containing gases, for example to the atmosphere.

While such inhibitors are efficacious in suppressing oxidation in tetrahydrofuran, they suffer from the disadvantage that tetrahydrofuran containing them tends to become discoloured. It will be understood that such discoloured tetrahydrofuran is unattractive in appearance and may be undesirable for many uses.

We have now found that the oxidation or peroxidation of liquid organic compounds, in particular the peroxidation of cyclic ethers, and more particularly of tetrahydrofuran, is inhibited by providing for the presence in them of a small quantity of a tri-alkylated phenol such as 2:4:6-trimethyl phenol, 2:4-dimethyl, 6-tertiary butyl phenol or 4-methyl, 2:6-tertiary butyl phenol, and that the use of these inhibitors is not accompanied by undesired discolouration.

The following is a record of experiments which illustrates the advantages that can be obtained by using the invention.

In the experiments tetrahydrofuran was used which had been freed of any recognisable traces of both peroxide and peroxidation inhibitor by distillation. 40 ml. portions of this tetrahydrofuran were put into conical flasks, 1/20,000 mol. of one of four selected phenols as shown below being added to each of four of these portions, a fifth being left blank for comparison, and all of these portions being aged in contact with air at room temperature for 80 days. The result was as follows:

| Phenol | Peroxide after 80 days' ageing as tetrahydrofuran peroxide (gm./mol.) |
|---|---|
| Blank | 0.034 |
| Phenol | 0.031 |
| Hydroquinone | 0.004 |
| 2,4,6-Trimethyl Phenol | 0.002 |
| 2,4-Dimethyl, 6-Tertiary Butyl Phenol | 0.003 |

The final solution when using hydroquinone as inhibitor, was discoloured, whereas when using trialkylated phenols as inhibitors, a much more attractive and undiscoloured product was obtained.

It will be seen that in these experiments about 0.02 to 0.025% by weight of the tri-alkylated phenol were present in the tetrahydrofuran. In general it can be said that satisfactory results can be obtained by providing for the presence of up to 1.0% by weight of the phenol in the cyclic ether, but normally amounts of less than 0.1% by weight give satisfactory stabilisation.

Examples of saturated cyclic ethers to which the process of the present invention is applicable are tetrahydrofuran, tetrahydropyran, dioxane and their alkyl substituted derivatives.

In the claims that follow, the term "ether compound" will be used to denote an ether or alkyl substituted derivative thereof.

I claim:

1. A new undiscoloured composition of matter comprising a compound selected from the group consisting of tetrahydrofuran, tetrahydropyran, dioxane and their alkyl substituted derivatives and, as an inhibitor of peroxidation, a phenol having the general formula

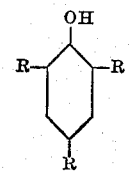

wherein R is selected from the group consisting of methyl and tertiary butyl.

2. A composition as claimed in claim 1 wherein the phenol is present in amount up to 1.0% by weight.

3. A composition as claimed in claim 1 wherein the phenol is present in amount of from 0.01 to 0.1% by weight of the ether compound.

4. A new undiscoloured composition of matter comprising a compound selected from the group consisting of tetrahydrofuran, tetrahydropyran, dioxane and their alkyl substituted derivatives and, as an inhibitor of peroxidation, up to 1.0% of 2:4:6-trimethyl phenol.

5. A new undiscoloured composition of matter comprising a compound selected from the group consisting of tetrahydrofuran, tetrahydropyran, dioxane and their alkyl substituted derivatives and, as an inhibitor of peroxidation, up to 1.0% by weight of 2:4-dimethyl, 6-tertiary butyl phenol.

6. A new undiscoloured composition of matter comprising a compound selected from the group consisting of tetrahydrofuran, tetrahydropyran, dioxane and their alkyl substituted derivatives and, as an inhibitor of peroxidation, up to 1.0% by weight of 4-methyl, 2:6-tertiary butyl phenol.

ARTHUR WILLIAM CHARLES TAYLOR.

REFERENCES CITED

The following references are of record in the file of this patent:

UNITED STATES PATENTS

| Number | Name | Date |
|---|---|---|
| 2,080,142 | Lowry | May 11, 1937 |
| 2,257,869 | Trautman | May 11, 1937 |
| 2,114,832 | Evans | Apr. 19, 1938 |
| 2,248,828 | Stevens | July 8, 1941 |
| 2,462,426 | Reiff | Feb. 22, 1949 |
| 2,470,447 | Glider | May 17, 1949 |
| 2,476,833 | Albert | July 19, 1949 |
| 2,489,260 | Bordner | Nov. 29, 1949 |